United States Patent

Desai

(10) Patent No.: US 12,461,826 B2
(45) Date of Patent: Nov. 4, 2025

(54) FAILURE RECOVERY IN A SCALEOUT SYSTEM USING VECTOR CLOCK

(71) Applicant: Dell Products L.P., Round Rock, TX (US)

(72) Inventor: Keyur B. Desai, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 135 days.

(21) Appl. No.: 18/464,726

(22) Filed: Sep. 11, 2023

(65) Prior Publication Data

US 2025/0086068 A1  Mar. 13, 2025

(51) Int. Cl.
*G06F 11/14* (2006.01)
*G06F 11/08* (2006.01)
*H04L 67/10* (2022.01)

(52) U.S. Cl.
CPC .......... *G06F 11/1469* (2013.01); *G06F 11/08* (2013.01); *H04L 67/10* (2013.01)

(58) Field of Classification Search
CPC ....... G06F 11/08; G06F 11/14; G06F 11/1469
See application file for complete search history.

(56) References Cited

U.S. PATENT DOCUMENTS

| 6,772,367 | B1* | 8/2004 | Tarafdar | G06F 11/3632 714/E11.212 |
| 10,621,049 | B1 | 4/2020 | Certain et al. | |
| 11,704,201 | B2* | 7/2023 | Desai | G06F 11/1604 714/4.11 |
| 2015/0172412 | A1 | 6/2015 | Escriva et al. | |
| 2019/0079950 | A1* | 3/2019 | Ramabaja | H04L 9/3239 |
| 2019/0377701 | A1* | 12/2019 | Mishra | G06F 13/364 |
| 2020/0151163 | A1 | 5/2020 | Aron et al. | |
| 2021/0018953 | A1 | 1/2021 | Ford | |
| 2022/0253363 | A1* | 8/2022 | Zhang | G06F 11/2094 |
| 2022/0405178 | A1* | 12/2022 | Zhang | G06F 11/1451 |
| 2023/0168972 | A1* | 6/2023 | Desai | G06F 11/1451 714/4.11 |

* cited by examiner

*Primary Examiner* — Kamini B Patel
(74) *Attorney, Agent, or Firm* — Workman Nydegger (57) ABSTRACT

Determining a failure recovery line in a distributed scaleout computing system. Each node or process of a distributed system has or is associated with a vector clock that includes a logical clock for each node in the distributed system. When failure is detected, a recovery operation may be performed using the vector clock. After the recovery operation, the vector clock is updated such that the failure recovery line is available in the computing system.

17 Claims, 6 Drawing Sheets

FAILURE RECOVERY IN A SCALEOUT SYSTEM USING VECTOR CLOCK

FIELD OF THE INVENTION

Embodiments of the present invention generally relate to failure recovery operations. More particularly, at least some embodiments of the invention relate to systems, hardware, software, computer-readable media, and methods for failure recovery operations in systems including distributed Scaleout systems.

BACKGROUND

Distributed scaleout systems, which may include replication environments, may experience different types of failure. Failure in these types of systems is often a characteristic of their scale. One potential solution to this problem, which distributed Scaleout systems often provide, is to have redundancy. While redundancy may allow some failures to be transparent, there are many instances where it is necessary to repair or replace failed operations and resume from a point prior to the failure. To recover from the failure that is not transparent, it is often necessary to process the failure and restart the job or operation.

For example, distributed scaleout systems may be used to perform replication operations. When a failure occurs, it may be necessary to restart the replication operations from the point of failure or just prior to the point of failure. This ensures that the replication operation is properly performed, and that data is successfully replicated without loss. The difficulty often lies in identifying the point of failure and resuming from that point.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to distributed systems including distributed scaleout systems, generally referred to as distributed systems. More particularly, at least some embodiments of the invention relate to systems, hardware, software, computer-readable media, and methods for failure recovery in distributed systems. An example may include performing failure recovery in in the context of replication operations. In general, example embodiments of the invention further relate to distributed and/or scaleout operations, recovery operations, vector clock operations, or the like or combination thereof.

Due to the scale of distributed systems, failure is likely to occur. While distributed systems may have sufficient redundancy to make failures transparent, there are other occasions where it is necessary to repair or replace failed operations and resume from the point of failure. Failure recovery may include performing some type of backup operation, such as performing snapshot operations, and/or logging operations. Snapshots generally include periodically saving a state of a process. Logging includes recording the operations that produced the current state of the process such that, if necessary, the operations can be repeated.

For example, a node in a cluster may fail and may be rolled back or restored to a previous state. Once the node is restored to the previous stated, the node can repeat the operations that were previously performed between the restored state and the point of failure. This may include replaying PRCs (Remote Procedure Calls) or other messages (generally referred to as messages) that may have been sent to other systems/nodes/processes.

Other nodes in the cluster should be able to tolerate these messages that are being replayed (such as idempotent operations), detect these messages, and/or discard these messages. If the other nodes are unable to tolerate these messages, the other nodes must also be rolled back to a previous or prior state.

A cascading rollback occurs when the rollback of one node (or system) to a previous state causes another node or system to rollback to a previous state or requires another node or system to be rolled back to a previous state. Eventually, the nodes reach a state where all of the nodes can move forward together. This state where all of the nodes can move forward together is referred to herein as a recovery line.

In one example of failure recovery, nodes in cluster may rollback to a recovery line. Embodiments of the invention relate to finding or identifying the recovery line in a distributed scaleout system using a vector clock.

When executing distributed algorithms or operations, such as resource synchronization or replication, the operations may rely on a method or environment that is configured to order the events that occur. For example, a system may include two processes and a disk. The processes may send messages to each other and to the disk requesting access. The disk may grant the requests to access the disks in the order the messages were received.

For example, process A may send a message to the disk requesting write access and then send a read instruction message to process B. Process B receives the message and, as a result, sends a read request message to the disk. If there is a timing delay causing the disk to receive both messages from the process A and the process B at the same time, the disk can determine which message happened first. The message from process A occurred before the message from process B if one can go from process A to process B by a sequence of moves of two types: moving forward while remaining in the same process, and following a message from the sending of the operation to the reception of the operation. A logical clock provides a mechanism to provide information such that the order of events can be determined.

Causality (also referred to as causation, or cause and effect) relates to the influence by which one event, process, state or object (a cause) contributes to the production of another event, process, state or object (an effect) where the cause is partly responsible for the effect, and the effect is partly dependent on the cause. In general, a process has many causes, which are also said to be causal factors. All causal factors are in the past with respect to the process. An effect can in turn be a cause of, or causal factor for, many other effects, which are in the future with respect to the process.

A vector clock is an example of a mechanism for capturing chronological and causal relationships in a distributed scaleout system. A vector clock maintains a vector of logical clocks for each communicating node (or host, process, etc.). Every time a message is exchanged, the sending node sends not only what the sending node knows about the global state of time, but also the state of time that the sending node received from other nodes.

More generally, a scalable distributed system typically refers to a computing system or configuration that grows in response to need. For example, a scalable system may add more resources (e.g., nodes) as more users are added. A scalable system may add more resources when workload or resource demand increases. Scalability generally relates to the addition (or removal) of software/hardware resources, such as nodes, in a computing system.

Figure 1:
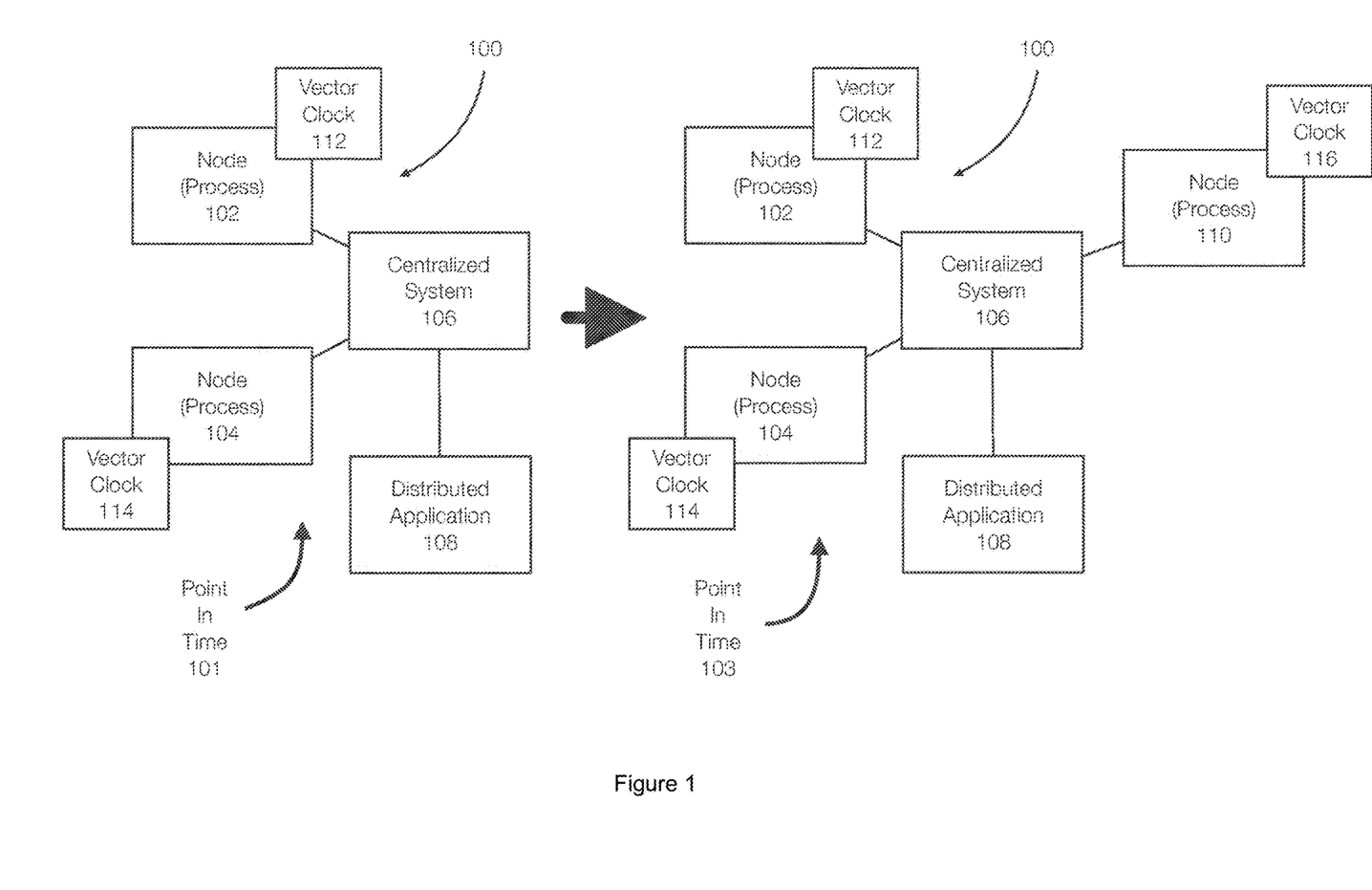
FIG. 1 discloses aspects of a distributed scaleout computing system or environment.

FIG. 1 discloses aspects of a distributed scaleout system or a scalable distributed system. FIG. 1 illustrates a distributed computing system 100 at a point in time 101 and at a point in time 103. At the point in time 101, the distributed computing system 100 includes a node (or process) 102 and a node (or process) 104. The nodes 102 and 104 may be controlled or coordinated by a centralized system 106 and may operate a distributed application 108.

The point in time 103 illustrates that scaling has occurred in the computing system 100. More specifically, a node (or process) 110 has been added to the distributed computing system 100. The node 110 may be added due to load balancing, additional users, or for other reasons.

FIG. 1 further illustrates that each of the nodes 102, 104, and 110 are associated with, respectively, vector clocks 112, 114, and 116. The vector clocks 112, 114, and 116 are configured to capture chronological and causal relationships in the distributed scaleout system 100.

Figure 2:
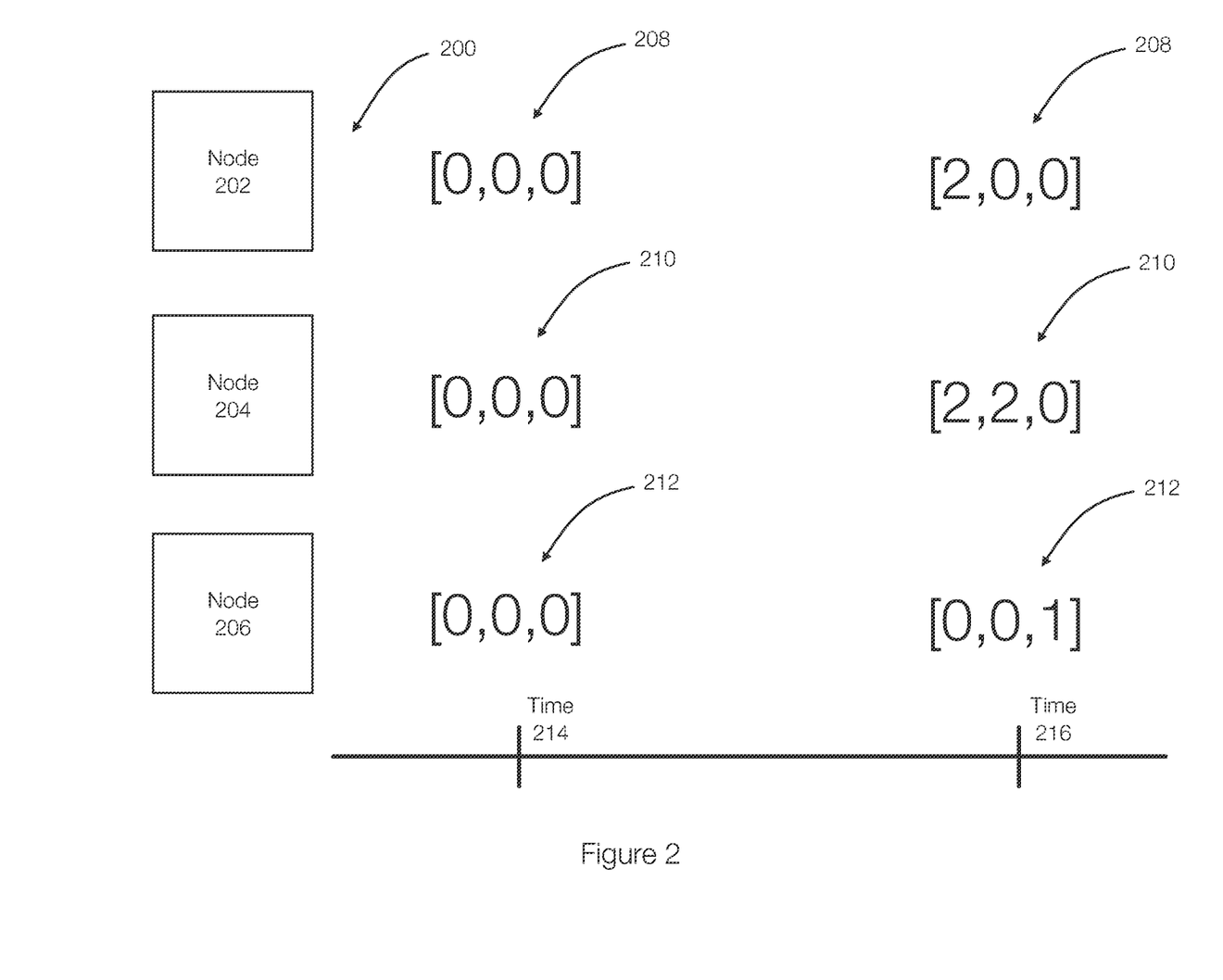
FIG. 2 discloses aspects of vector clocks in a distributed scaleout computing system.

FIG. 2 discloses aspects of vector clocks. FIG. 2 illustrates a distributed scaleout system 200 that includes nodes 202, 204, and 206, which may have been added to the distributed system 200 at different times. In this example, when a node is added to the system 200, a vector clock may be initiated and the initial values of that vector clock may all be zeros, which reflects that the node is unaware of events at other nodes and that no events have occurred at the node itself.

In this example, the node 202 is associated with a vector clock 208. The nodes 204 and 206 are associated with, respectively, the vector clocks 210 and 212. The vector clocks 208, 210, and 212 each include an entry for each node in the system 200. Thus, the vector clock 208 includes an entry for each node in the system 200. In this example, the first entry in the vector clock 208 corresponds to the node 202 and the other entries correspond to other nodes in order. Thus, the first (208), second (210), and third (212) entries the vector clocks correspond, respectively, to the first (202), second (204), and third (206) nodes in the system 200. For example, the second entry in the node 210 corresponds to the node 204 and the third entry in the vector clock 212 corresponds to the node 206.

At time 214, the vector clocks 208, 210, and 212 are all zeros. At time 216, events have occurred between the time 214 and the time 216. The vector clock 208 at the time 216 indicates that the node 202 is aware of two events that have occurred at the node 202 and that the node 202 is not aware of events at the other nodes 204 and 206. The vector clock 210 illustrates that the node 204 is aware of two events that occurred at the node 204 itself and two events that occurred at the node 202. The node 204 is not aware of events at the node 206. The vector clock 212 at the time 216 indicates that the node 206 is only aware of an event that occurred at the node 206 itself.

Figure 3:
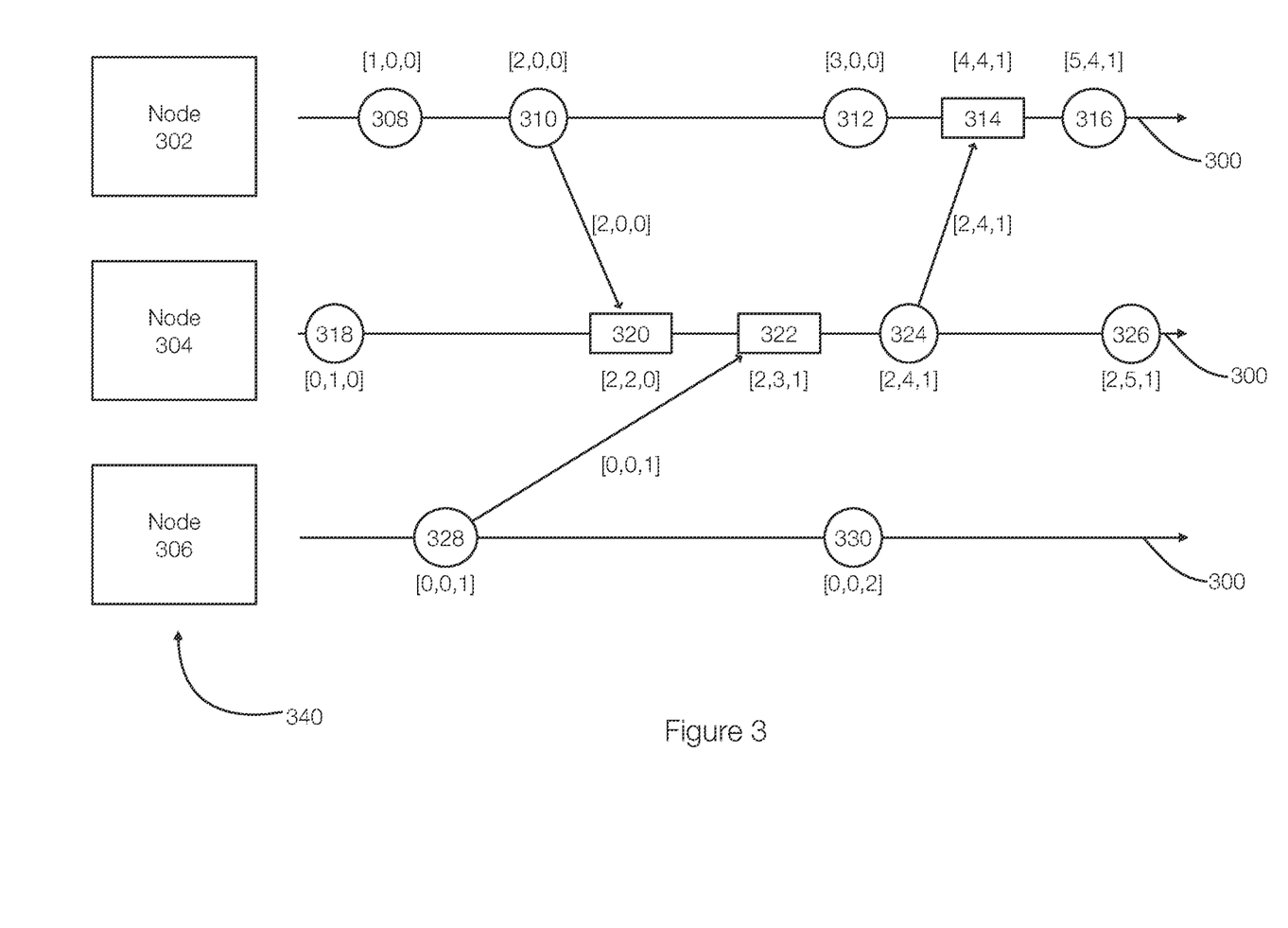
FIG. 3 discloses aspects of updating vector clocks with respect to events that occur in the distributed system.

FIG. 3 discloses aspects of vector clocks and changes to vector clocks in a distributed computing systems. FIG. 3 illustrates nodes 302, 304, and 306 that are operating in a distributed system and associated with a timeline 300. In FIG. 3, internal events that occur at a node are represented as circles and events associated with messages between nodes are represented as rectangles.

For example, the node 302 experiences internal events 308, 310, 312, and 316 and external event 314. The node 304 experiences internal events 318, 324, and 326 and external events 320 and 322. The node 306 experiences internal events 328 and 330.

FIG. 3 illustrates a vector clock for each of the three nodes 302, 304, and 306. The vector clock is illustrated alongside each of the illustrated events. In this example and because there are three nodes, the vector clock has a format [x,y,z], where x corresponds to the node 302, y corresponds to the node 304, and z corresponds to the node 306.

Thus, every node includes or is associated with a vector clock. The number of entries in the vector clock is equal to the number of nodes in the distributed system. Thus, the number of entries in the vector clock may change as the system scales. Each entry in the vector clock is a logical clock of a particular node in the distributed system.

In one example embodiment, the vector clock is updated according to the following rules, which are provided by way of example. The first rule is that every time an internal event occurs on a node, the value of the node's logical clock in the vector clock is incremented by 1. The second rule is that every time a node sends a message to another node, the value of the logical clock for the recipient node is incremented by one.

For example, when the event 308 occurs, the logical clock of the node 302 is incremented to 1 in the vector clock of the node 302. At the event 310, the node executes the first rule and increments the logical clock of the node 302 from 1 to 2.

When the event 318 occurs at the node 304, the logical clock (at the second position) of the vector clock of the node 304 is increased to 1. At the event 320, the second rule may also be executed because a message is received from the node 302 and associated with the event 310. In this example, the event causes the logical clock of the node 304 in the vector clock of the node 304 to be increased from [0,1,0] to [0,2,0]. At the same time, the information shared by the node 302 is used to update the logical clock of the node 304 in the vector clock of the node 304. More specifically, the logical clock of the vector clock of the node 304 is changed from [0,2,0] to [2,2,0] due to receiving the vector clock [2,0,0] from the node 302.

For the node 302, the logical clock of the node 302 (first position of the vector clock) is updated from 1 to 5 as 5 events are experienced. The vector clock associated with the event 316 illustrates that the node 302 is aware of 4 events (from the logical clock of the node 304 at the second position) of the node 304 and 1 event of the node 306. FIG. 3 further illustrates that some nodes may not be initially aware of some events at other nodes. For example, the node 302, whose vector clock is [5,4,1] at the event 316 is unaware of the event 330.

FIG. 3 thus illustrates examples of vector clock transitions for the vector clocks of each of the nodes 302, 304, and 306 included in the distributed scaleout system 340.

Figure 4:
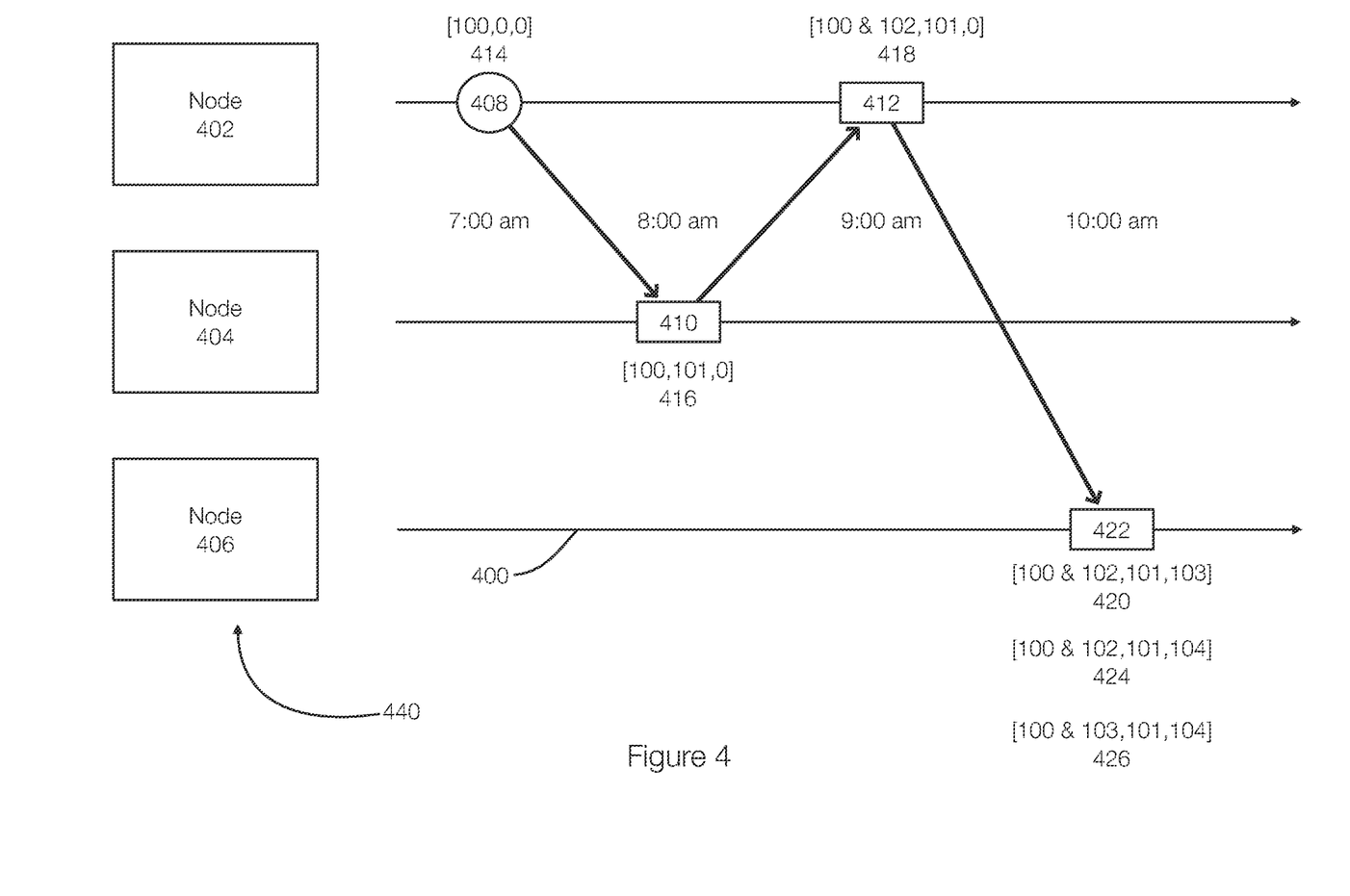
FIG. 4 discloses aspects of a determining a failure recovery line and of performing a recovery operation.

FIG. 4 discloses aspects of determining a failure recovery line in a distributed scaleout system. The example illustrated in FIG. 4 may determine a failure recovery line in a cluster using snapshots and logging. The distributed system 440, in this example, includes nodes 402, 404, and 406.

In FIG. 4, the node 402 is booted at 7:00 am. A vector clock 414 represents the event 408. In one example, a monotonically increasing atomic generator number is used to track the event in the vector clock 414. In this example, the snapshot S1 is associated with the generation of the number 100. An internal reference may also be stored to map S1 to 100 to 7:00 am (time). Thus, S1 is referred to by the generation number 100 in the vector clock 414.

At 8:00 am, the load on the system 440 increases and the node 404 is added. A snapshot S2 is then taken, due to the addition of the node 404. The snapshot S2 is identified by generation number 101 in the vector clock. Thus, the vector clock 416, which represents or is associated with the event 410 and associated with the node 404, includes the generation number 101 for the snapshot S2 event and reflects the information learned from the node 402, which is the generation number 100 associated with the snapshot S1 at the node 402.

The system 440 may have a policy to take a snapshot every 2 hours. Thus, at 9:00 am, a snapshot S3 is taken at the node 402. The snapshot S3, which is associated with the event 412, is identified by the generation number 102. The vector clock 418 of the node 402 is thus updated to reflect that the node 402 is associated with generation numbers 100 and 102. The vector clock 418 of the node 402 is updated to include information learned from the node 404, which is that the node 404 is associated with generation number 101 (or snapshot S2). In this example, the vector clocks 414 and 418 represent the same vector clock of the node 402 at different points in time. At the time of the event 412, the vector clock of the node 404 is still [100,101,0].

At 10:00 am, the load increases such that the node 406 is added to the system 440. A snapshot S4 is performed and is identified by the generation number of 103. Thus, the vector clock of the node 406, associated with the event 422, reflects the generation number 103 of the event 422 and the information learned from the vector clock 418 of the node 412. FIG. 4 thus illustrates transitions in a distributed system 440 and the impact of those transitions or events on the vector clocks of, respectively, the nodes 402, 404, and 406 of the system 440.

In one example, assume that the snapshot S4 is performed when the node 406 is added to the system 440 (e.g., cluster). However, adding the node 406 resulted in a failure and it is necessary to recover the system 440. In this example, the vector 420 is evaluated. The vector 420 indicates that four snapshots were performed: 2 snapshots on the node 402 with generation numbers 100 and 102, one snapshot on the node 404 with a generation number of 101, and one snapshot on the node 406, with a generation number of 103. Thus, the vector clock 420 is: [100 & 102, 101, 103].

Because the failure occurred on adding the node 406, embodiments of the invention rollback to the last known state using the vector clock 420. The last known stat is the snapshot taken with the generation number 102 on the node 402. Thus, the system 440 rolls back to that state using the snapshot S3 and the logs are replayed.

As the logs are being replayed starting from the snapshot S3, an error is found at 9:50 am. This allows the system 440 to determine that the node 406 can be restarted by replaying the logs up to 9:50 am (the time of the error). The snapshot S4 associated with generation number 103 is then dropped and a new snapshot S5 is performed at the node 406. The internal reference relates the snapshot S5 to generation number 104 at 9:50 am (time). The vector clock of the node 406 is also updated. At this point of the operation, a recovery line is established in the system 440 and is represented by the vector clock 424 of [100&102, 101, 104].

If it is necessary to perform a cascaded rollback (e.g., the snapshot S3 is corrupt), the recovery would start from the snapshot S2 and generation number 101 from the node 404. The logs would be replayed and the generation numbers, as needed, would be dropped and replaced with new generation numbers associated with new snapshots as necessary. Thus, in the case of a cascaded rollback, the snapshot S3 is dropped, logs are replayed from the snapshot S2 and the snapshots S3 and S4 are generated, with new generation numbers to ensure that a failure recovery line is available. In this example, the vector clock would be the vector clock 426 of [100&103, 101, 104] after replaying the logs and retaking the snapshots at the node 402 and 406.

Traditional snapshots taken in a cluster or distributed system fail to capture the chronological and causal relationships in a distributed scaleout system. Embodiments of the invention provide a vector clock that captures chronological and causal relationships in a scaleout system and helps establish a failure recovery line faster. Embodiments of the invention further facilitate recovery when cascading rollbacks are involved and establishing a failure recovery line involves rollbacks across multiple nodes in a cluster. A vector clock, which accounts for chronological and causal relationships, helps failure recovery lines be established more quickly compared to traditional snapshots.

Figure 5:
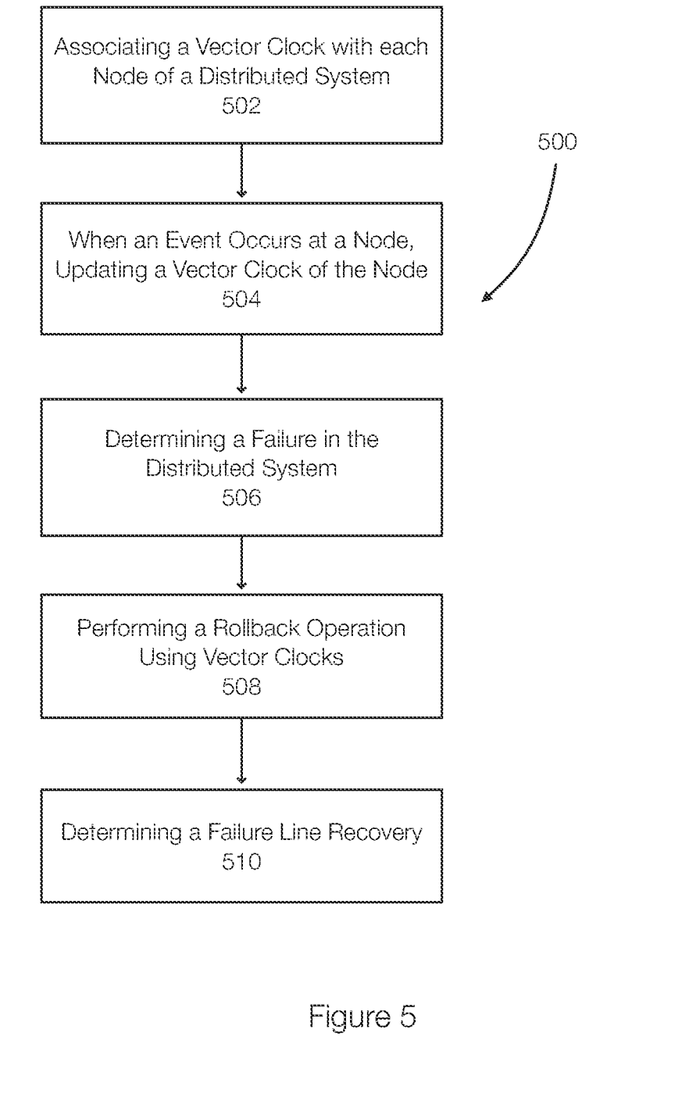
FIG. 5 discloses aspects of an example method for determining a failure recovery line and performing a recovery operation or a cascaded recovery operation.

FIG. 5 discloses aspects of determining a recovery line and performing a recovery operation in a distributed scaleout computing system. The method 500 includes associating a vector clock with each node (or process, host, etc.) operating in the distributed system. The vector clock may be configured to change in size or length as nodes are added/removed from the distributed system. Alternatively, the vector clock may have a size associated with the maximum number of nodes possible in the distributed system (thus many of the entries would be 0 until the corresponding nodes are added to the system). Each entry in the clock vector is a logical clock for a corresponding node. Thus, each entry corresponds to a particular node in the distributed system. From the perspective of a particular node, the clock vector includes a home logical clock and away logical clocks. Each of the nodes may receive a copy of the vector clock, which may be initialized to all zeros.

When an event occurs at a node, the vector clock of that node is updated 504. When the event is an internal event, only the vector clock of that node is updated. If the event is associated with another node or if a message is sent, the message includes a copy of that node's vector clock. This allows the node that receives the message to update their own vector clock to reflect the information included in the vector clock of the sending node. In the event a message is received, the receiving node will also update their own logical clock in the vector clock to reflect the event.

Next, the distributed system may determine 506 that a failure has occurred in the distributed system. In response to determining that a failure has occurred, a rollback operation is performed 508 using the vector clock. The vector clock establishes a chronological and causal relationship between the nodes. For instance, if failure is determined at a first node, the vector clock of the first node is evaluated to identify a previous state for the distributed system, which may be associated with a different node. The vector clock may identify the node that has the most recent previous state in one embodiment.

After performing (or while performing) the recovery operation, the point of failure may be determined and a failure line recovery is determined 510. Determining the failure line recovery may include discarding a logical clock in the vector clock and replacing the discarded logical clock with a new logical clock. This ensures that the vector clock establishes a failure line even after recovering from the failure. Determining 410 a failure line recovery may also include performing the recovery operation. This may include restoring a snapshot, performing or replaying entries in a log, or the like until the distributed system is recovered. In one example, determining a failure line recovery may also include performing a cascaded rollback operation.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data operations, data replication operations, scaling operations, vector clock related operations, or the like. More generally, the scope of the invention embraces any operating environment in which the disclosed concepts may be useful.

At least some embodiments of the invention provide for the implementation of the disclosed functionality in backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of various operations that may include collecting, modifying, and creating data. As such, a particular client may employ, or otherwise be associated with, one or more instances of each of one or more applications that perform such operations with respect to data. Such clients may comprise physical machines, containers, or virtual machines (VMs).

It is noted that any of the disclosed processes, operations, methods, and/or any portion of any of these, may be performed in response to, as a result of, and/or based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples.

In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: associating a vector clock with each node in a distributed scaleout system, when an event occurs at a node, updating a vector clock associated with the node, determining a failure in the distributed scaleout system, performing a rollback operation using the vector clocks, wherein the vector clocks identify a failure recovery line for recovering the distributed scaleout system from the failure, and performing a recovery operation based on the failure recovery line.

Embodiment 2. The method of embodiment 1, wherein each of the vector clocks includes a home logical clock for a corresponding node and one or more away logical clocks for other nodes in the distributed Scaleout system.

Embodiment 3. The method of embodiment 1 and/or 2, wherein the event is an internal event, further comprising updating the home logical clock in the vector clock of the node that experienced the internal event.

Embodiment 4. The method of embodiment 1, 2, and/or 3, wherein the event is an external event, further comprising updating a home logical clock in the vector clock of the node and updating the vector clock of the node based using a vector clock of a sending node that sent the event to the node.

Embodiment 5. The method of embodiment 1, 2, 3, and/or 4, further comprising performing a cascaded rollback operation using the vector clocks.

Embodiment 6. The method of embodiment 1, 2, 3, 4, and/or 5, wherein the recovery operation includes recovering from a snapshot and replaying logs, wherein the logs store a chronological history of events in the distributed scaleout system.

Embodiment 7. The method of embodiment 1, 2, 3, 4, 5, and/or 6, further comprising updating the vector clocks such that the vector clocks include a failure recovery line that accounts for the recovery operation.

Embodiment 8. The method of embodiment 1, 2, 3, 4, 5, 6, and/or 7, wherein some entries in the vector clocks are deleted and replaced with new entries.

Embodiment 9. The method of embodiment 1, 2, 3, 4, 5, 6, 7, and/or 8, further comprising scaling the distributed computing system, wherein a vector clock of a new node added to the distributed computing system is initialized to zeros.

Embodiment 10. The method of embodiment 1, 2, 3, 4, 5, 6, 7, 8, and/or 9, further comprising moving multiple nodes forward from a recovery line after using the failure recovery line to identify the recovery line.

Embodiment 11. A method for performing any of the operations, methods, or processes, or any portion of any of these, or any combination thereof disclosed herein.

Embodiment 12. A non-transitory storage medium having stored therein instructions that are executable by one or more hardware processors to perform operations comprising the operations of any one or more of embodiments 1 through 11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, client, service, or the like may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
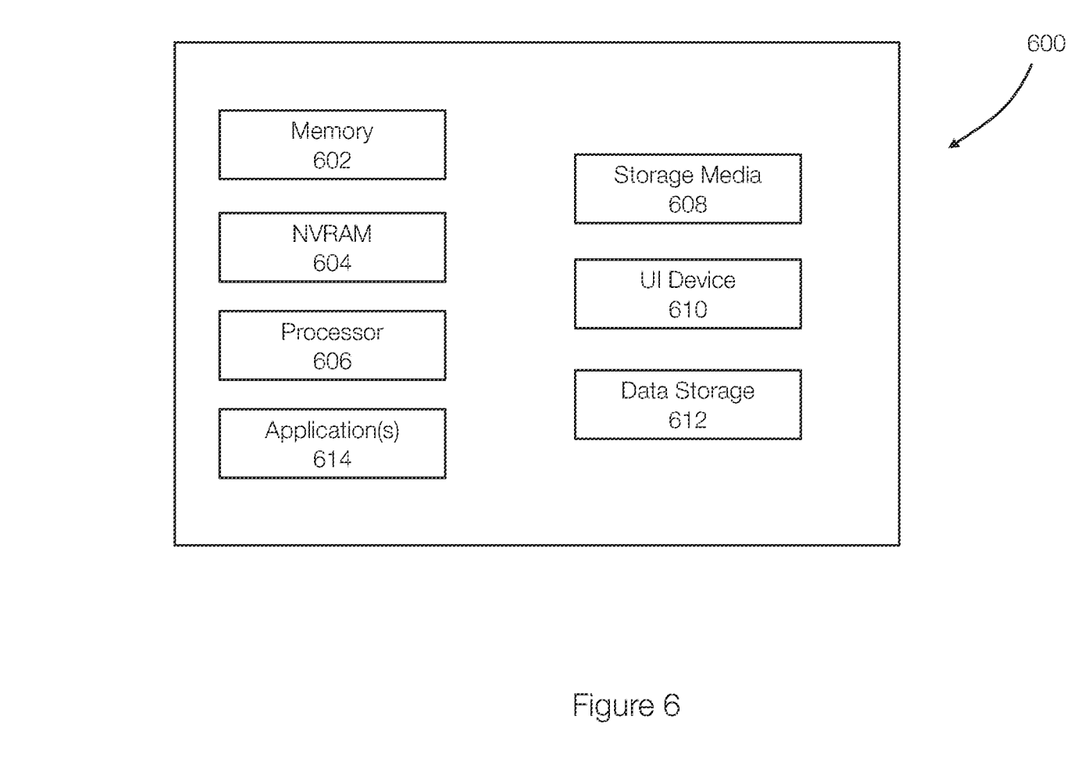
FIG. 6 discloses aspects of a computing device, system, or entity.

With reference briefly now to FIG. 6, any one or more of the entities disclosed, or implied, by the Figures and/or elsewhere herein, may take the form of, or include, or be implemented on, or hosted by, a physical computing device, one example of which is denoted at 600. As well, where any of the aforementioned elements comprise or consist of a virtual machine (VM) or a container, that VM or container may constitute a virtualization of any combination of the physical components disclosed in FIG. 6.

In the example of FIG. 6 the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
associating a vector clock with each node in a distributed scaleout system, wherein each of the vector clocks includes a home logical clock for a corresponding node and one or more away logical clocks for other nodes in the distributed Scaleout system;
when an event occurs at a node, updating a vector clock associated with the node, wherein updating the vector clock includes, when the event is an internal event, updating the home logical clock in the vector clock of the node that experienced the internal event;
determining a failure in the distributed scaleout system;
performing a rollback operation using the vector clocks, wherein the vector clocks identify a failure recovery line for recovering the distributed scaleout system from the failure; and
performing a recovery operation based on the failure recovery line.

2. The method of claim 1, wherein the event is an external event, further comprising updating a home logical clock in the vector clock of the node and updating the vector clock of the node based using a vector clock of a sending node that sent the event to the node.

3. The method of claim 1, further comprising performing a cascaded rollback operation using the vector clocks.

4. The method of claim 3, wherein the recovery operation includes recovering from a snapshot and replaying logs, wherein the logs store a chronological history of events in the distributed scaleout system.

5. The method of claim 4, further comprising updating the vector clocks such that the vector clocks include a failure recovery line that accounts for the recovery operation.

6. The method of claim 5, wherein some entries in the vector clocks are deleted and replaced with new entries.

7. The method of claim 1, further comprising scaling the distributed computing system, wherein a vector clock of a new node added to the distributed computing system is initialized to zeros.

8. The method of claim 1, further comprising moving multiple nodes forward from a recovery line after using the failure recovery line to identify the recovery line.

9. A non-transitory storage medium having stored therein instructions that are executable by one or more hardware processors to perform operations comprising:
associating a vector clock with each node in a distributed scaleout system, wherein each of the vector clocks includes a home logical clock for a corresponding node and one or more away logical clocks for other nodes in the distributed Scaleout system;
when an event occurs at a node, updating a vector clock associated with the node, wherein updating the vector clock includes, when the event is an internal event, updating the home logical clock in the vector clock of the node that experienced the internal event;
determining a failure in the distributed scaleout system;
performing a rollback operation using the vector clocks, wherein the vector clocks identify a failure recovery line for recovering the distributed scaleout system from the failure; and
performing a recovery operation based on the failure recovery line.

10. The non-transitory storage medium of claim 9, wherein the event is an external event, further comprising updating a home logical clock in the vector clock of the node and updating the vector clock of the node based using a vector clock of a sending node that sent the event to the node.

11. The non-transitory storage medium of claim 9, further comprising performing a cascaded rollback operation using the vector clocks.

12. The non-transitory storage medium of claim 11, wherein the recovery operation includes recovering from a snapshot and replaying logs, wherein the logs store a chronological history of events in the distributed scaleout system.

13. The non-transitory storage medium of claim 12, further comprising updating the vector clocks such that the vector clocks include a failure recovery line that accounts for the recovery operation.

14. The non-transitory storage medium of claim 13, wherein some entries in the vector clocks are deleted and replaced with new entries.

15. The non-transitory storage medium of claim 9, further comprising scaling the distributed computing system, wherein a vector clock of a new node added to the distributed computing system is initialized to zeros.

16. The non-transitory storage medium of claim 9, further comprising moving multiple nodes forward from a recovery line after using the failure recovery line to identify the recovery line.

17. A method comprising:
associating a vector clock with each node in a distributed scaleout system, wherein each of the vector clocks includes a home logical clock for a corresponding node and one or more away logical clocks for other nodes in the distributed Scaleout system;
when an event occurs at a node, updating a vector clock associated with the node, wherein updating the vector clock includes, when the event is an external event, updating a home logical clock in the vector clock of the node and updating the vector clock of the node based using a vector clock of a sending node that sent the event to the node;
determining a failure in the distributed scaleout system;
performing a rollback operation using the vector clocks, wherein the vector clocks identify a failure recovery line for recovering the distributed scaleout system from the failure; and
performing a recovery operation based on the failure recovery line.

* * * * *